United States Patent [19]

Holzhausen

[11] Patent Number: 5,090,746
[45] Date of Patent: Feb. 25, 1992

[54] HINGED JOINT FOR PIPES

[75] Inventor: Wieland Holzhausen, Auerbach, Fed. Rep. of Germany

[73] Assignee: IWK Regler und Kompensatoren GmbH, Stutensee, Fed. Rep. of Germany

[21] Appl. No.: 501,544

[22] Filed: Mar. 30, 1990

[30] Foreign Application Priority Data

Apr. 18, 1989 [FR] France ............... 89 05762

[51] Int. Cl.$^5$ ............................................. F16L 27/107
[52] U.S. Cl. ..................................... 285/226; 285/364; 285/910
[58] Field of Search ............... 285/910, 223, 226, 406, 285/364

[56] References Cited

U.S. PATENT DOCUMENTS

| | | | |
|---|---|---|---|
| 4,643,463 | 2/1987 | Halling et al. | 285/226 |
| 4,659,117 | 4/1987 | Holzhausen | 285/226 X |
| 4,928,998 | 5/1990 | Brandena | 285/910 |

FOREIGN PATENT DOCUMENTS

| | | | |
|---|---|---|---|
| 2623520 | 12/1977 | Fed. Rep. of Germany | 285/406 |
| 268353 | 10/1929 | Italy | 285/406 |

Primary Examiner—Dave W. Arola
Attorney, Agent, or Firm—Antonelli, Terry, Stout & Kraus

[57] ABSTRACT

A hinged joint for pipes having a sealing element such as, for example, a pipe with corrugated walls and reinforcing flanges at each end. At a certain distance from its end, each pipe carries a flange, which has two diametrically arranged, outwardly directed fastening attachments, each serving to be directly or indirectly connected to the corresponding attachment of the other flange, so as to permit a rotary movement about an axis orthogonal to the axis of the pipes thereby resulting in a hinged joint, which is particularly suitable for joining motor vehicle exhaust pipes.

9 Claims, 3 Drawing Sheets

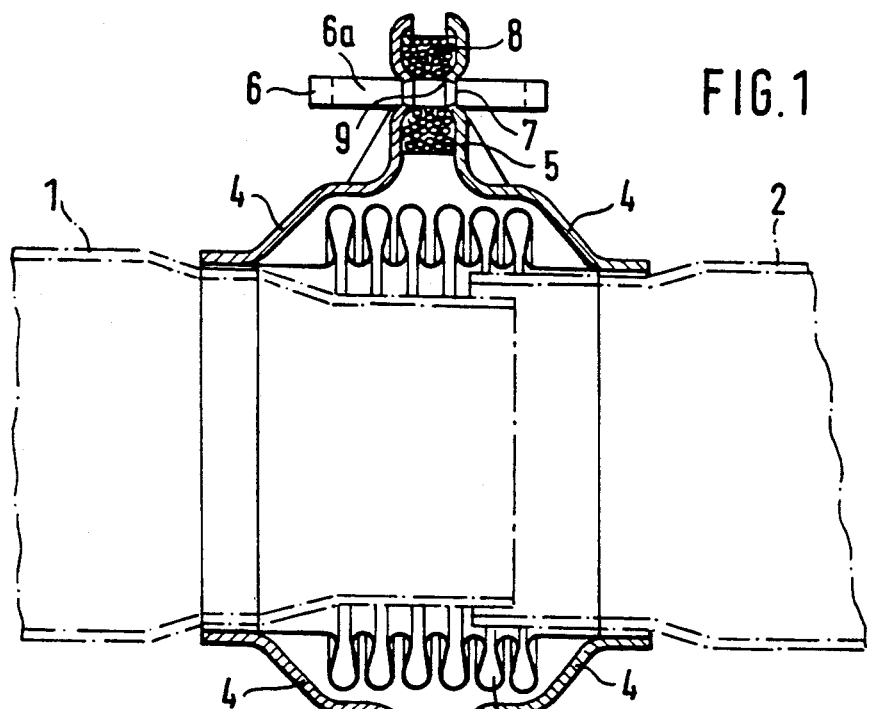
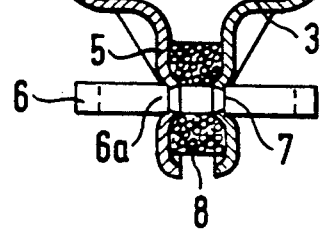
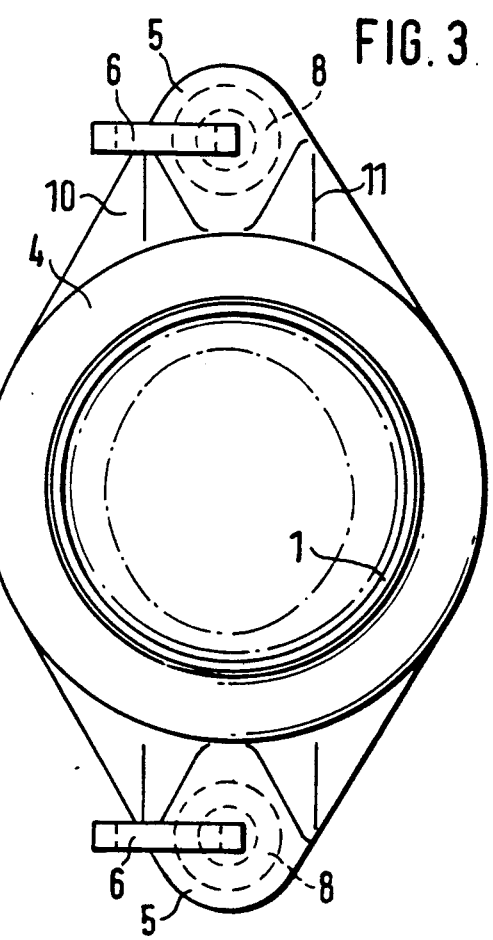

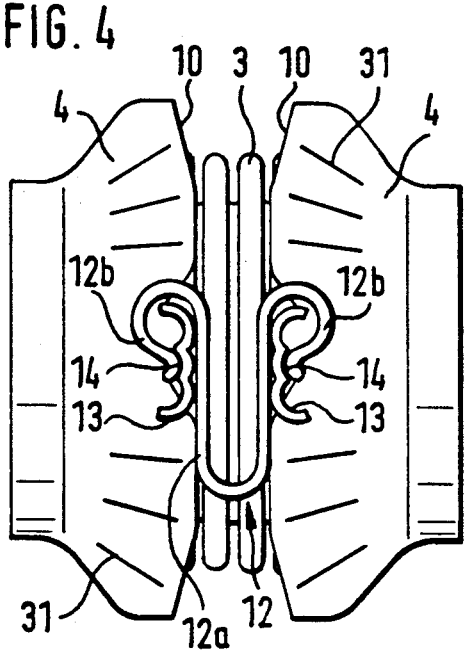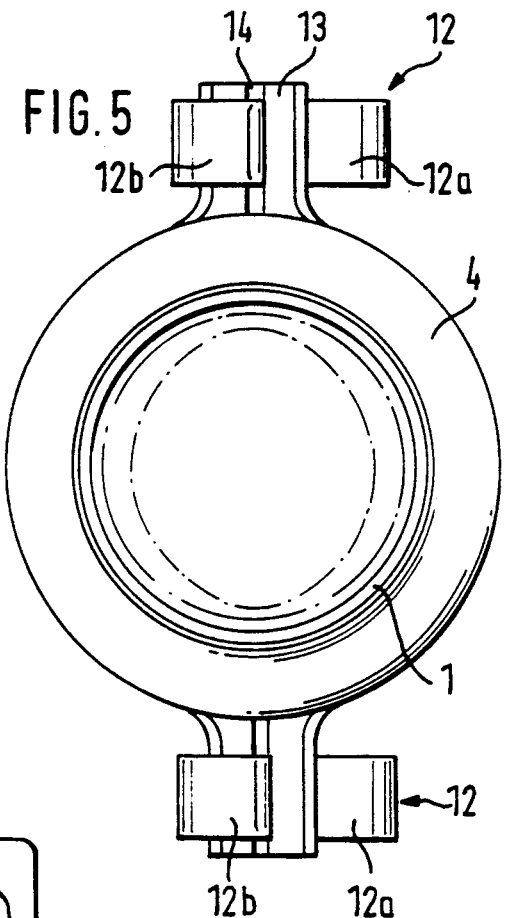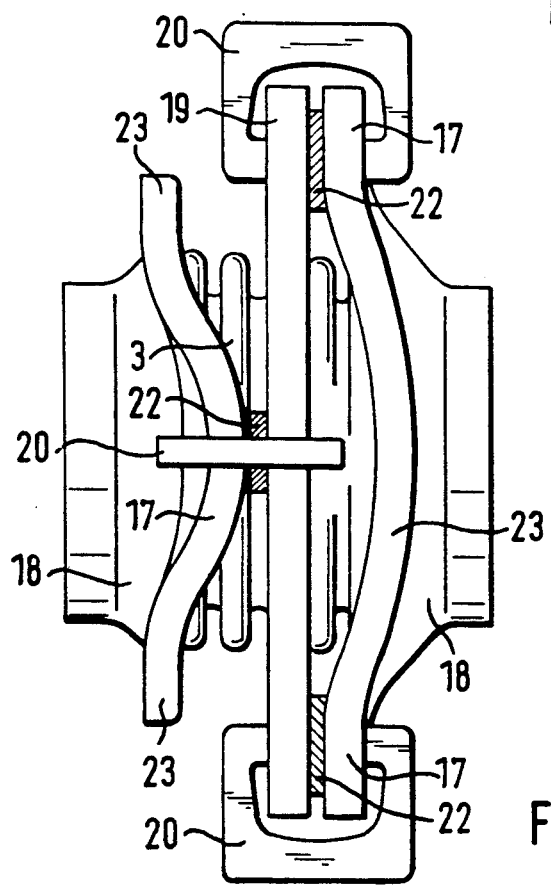

HINGED JOINT FOR PIPES

FIELD OF THE INVENTION

The invention relates to a hinged joint for pipes, which has a sealing element such as, for example, a pipe with corrugated walls and reinforcing flanges at each end.

BACKGROUND OF THE INVENTION

The hinged joint is used on pipes, which are in particular intended for transporting fluids at high temperatures, such as e.g. motor vehicle exhaust pipes. These pipes are generally made from metal, so as to be resistant to high temperatures and against the considerable vibrations and oscillations produced by pumps, turbines or engines to which they are connected. For motor vehicle exhaust pipes, it is necessary to provide joints enabling the engine vibrations to be damped in such a way that they are not transferred to the muffler or silencer, which would produce ambient noise. In addition, these joints must provide a good sealing action and must be able to withstand the considerable mechanical stresses and angular deflections produced through vehicle movements, for example, when travelling over a highway speed reduction strip, when cornering or abrupt clutch changing or braking.

It is necessary to connect the exhaust pipes in an articulated or hinged manner, so that the engine can move freely, because it is fitted to mounting supports made from an elastic material.

It is known to connect and join together in hinged manner two exhaust pipe elements, in that their widened ends are so inserted in one another that a spherical joint is formed, or their ends provided with radial flanges are elastically joined with the aid of bolts, which are elastically mounted, a ring gasket ensuring a certain tightness and a sperical joint connection.

However, the use of such joints is limited by their mediocre capacity to damp vibrations or noise, together with their inadequate tightness.

Hose or tubular elements are also used as joints, which have walls in rib form and a limited wall thickness, so that they have a certain elasticity. This permits a flexible hinged connection of the exhaust pipes in various directions, which ensures a complete tightness. This type of joint is used for motor vehicle exhausts. As a result of its great flexibility, the exhaust pipe can absorb difficulty controllable, disordered movements.

However, this tubular construction has a relatively high mechanical fragility with respect to impact from the outside or engine stresses.

As described in French patent 2 531 914, this disadvantage can be obviated by providing at the ends of the pipes to be connected reinforcing flanges and cushions made from slightly compressed metal wire at the contact points between the flanges. This ensures an excellent damping of vibrations and noise. This joint also has an excellent efficiency, but is expensive due to its complexity. Therefore, it is only used in vehicles in the higher price range. Moreover, the arrangements described in the aforementioned patent have a limited rotation range.

SUMMARY OF THE INVENTION

The aim underlying the present invention essentially resides in providing a tight joint of the aforementioned type which avoids the above noted disadvantages encountered in the prior art and which withstands considerable vibrations, damps noise, is simple to install and construct, and is inexpensive, while at the same time having a high mechanical strength.

The present invention provides an inexpensive, robust hinge joint for pipes, particularly, thermally and mechanically stressed pipe, which, while damping transmission of vibrations, still allows a large angular movement of the pipes with respect to each other.

According to the invention, at a certain distance from its end each pipe has a flange provided with two diametrically arranged, outwardly directed fastening attachments, whereof each is intended to be directly or indirectly connected to the corresponding attachment of the other flange, so that it is possible for a rotary movement to take place about an axis orthogonal to the axis of the pipes.

The part-shell-like connecting flanges of the two pipes do not prevent the angular movement. Compared with conventional angle flanges, the angular movement possibilities are much greater.

One embodiment of the invention involves the use of clamps made from elastic material, such as, for example, metal and cushions of metal wire, with the cushions being arranged between corresponding radial attachments and the ends of the clamps engage on the attachments of the flanges in such a way that the attachments are pressed against one another, accompanied by a partial deformation of the cushion.

The clamp is responsible for the connection of the flanges and is sufficiently elastic to ensure that the rotation permitted by its articulated connection is not impaired. The metal cushions serve as a base support for the flanges and as a rotation axis, while also permitting a certain vibration damping.

Preferably, the outer wall of the attachments has receptacles in which can be engaged the free ends of the open clamps, which ensures a more reliable fitting of the clamps.

Advantageously, the receptacles are formed by drawing or stamping, so that positioning elements for metal cushions are produced on the insides of the claws and each metal cushion is shaped in such a way that it can be engaged and positioned between the elements of two facing attachments. Thus, the open ring and the cushion are held precisely at the correct point.

A variant is obtained in that it has a metal clip, which is formed from a U-shaped clamp, whose free leg ends are bent back in such a way that they form clips, each of which is laterally engageable on the end of one of the two facing attachments. The use of the metal clips gives the advantage that there is no need for the metal cushions.

Another improved construction of the invention permitting a double hinged connection, is achieved in that the diameters of the flanges, in whose direction the attachments are oriented, are orthogonal or at an angle to one another and each attachment is connected to a central ring located between the two flanges and which serves as a gimbal. This double hinged connection permits a rotary movement with two degrees of freedom.

Tests have shown that it is advantageous if the flange has a bent round lateral edge and/or reinforcing ribs for stiffening purposes. This leads to an increase in the resonant frequency and, particularly in the automobile sector, can be moved away from motor excitation frequencies.

BRIEF DESCRIPTION OF THE DRAWINGS

The invention is described in greater detail hereinafter relative to various embodiments of a hinged joint and the attached drawings, wherein:

FIG. 1 is a longitudinal cross-sectional view of a hinged joint for pipes constructed in accordance with a first embodiment of the present invention;

FIG. 2 is a plan view of the hinge joint of FIG. 1;

FIG. 3, is an axial end view of the hinged joint of FIG. 1;

FIG. 4 is a plan view of connecting devices constructed in accordance with the present invention;

FIG. 5 is an axial end view of the connecting devices of FIG. 4;

FIG. 6 is a plan view of another embodiment of connecting devices constructed in accordance with the present invention;

DETAILED DESCRIPTION

Figure 7:
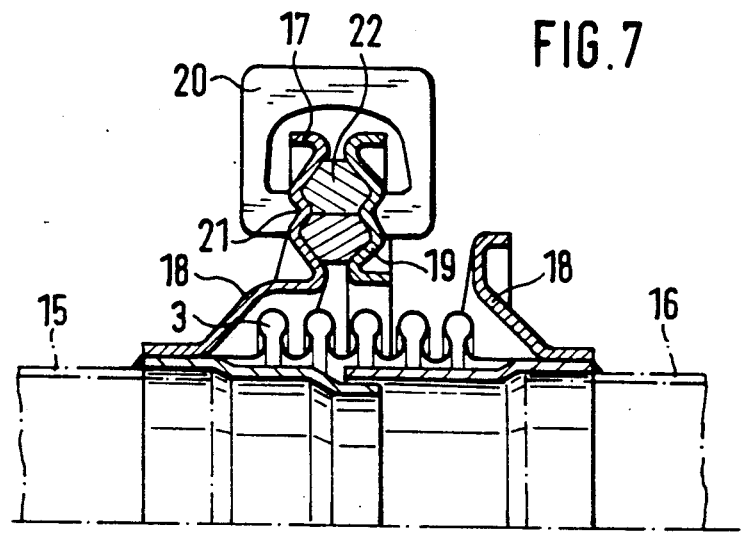
FIG. 7 is a longitudinal cross-sectional view of the connecting devices of FIG. 6.

Considered in different views, FIGS. 1 to 3 show two exhaust pipes 1 and 2, whose free ends are inserted in one another and which are tightly connected with the aid of a bellows 3, which has corrugated walls having a limited thickness. At an adequate distance from its free end, so that the free ends can in fact be inserted in one another, each pipe 1 and 2 has a metal flange 4, which as a clamp 4a partly engaging over the bellows 3. The free ends 5a of each metal flange 4 are diagonally facing attachments 5, which are directed radially outwards. Each attachment 5 extends up to corresponding attachment 5 of the other flange 4 in the unloaded state in parallel and with a limited spacing and is connected thereto by means of a part circular, metal clamp 6, whose free ends engage in receptacle 7 stamped into the remote outsides of the attachments 5 on a common diagonal, in whose direction extends the attachments 5 of flanges 4. The clamp 6 acts on the attachments 5 in such a way that they are pressed against one another, which leads to a partial deformation of a metal wire cushion 8, which is positioned between the two attachments 5 and which has a ring shape such that it is positioned by engagement on a projection 9, which is provided for this purpose, projects over the inner wall of the attachments 5 and results from the stamping of the receptacle 7.

Moreover, each of the flanges 4 has a lateral edge 10, which is drawn back parallel to the aforementioned diameter corresponding to a bent line 11.

Thus, pipes 1 and 2 can rotate about an axis, which coincides with the diameter connecting the diagonally facing metal cushions 8 and in whose direction are oriented the two attachments 5 of each of the two flanges 4. This is possible as a result of the flexibility of bellows 3, which forms the articulation axis of the pipe joint, due to the lateral edges 10, which do not impede the reciprocal angular movements of flanges 5, because the edges 10 are set back, due to the clamps 6, which are sufficiently elastic to permit this angular movement, while simultaneously ensuring the connection of the flanges and due to the metal cushions 8, which serve as a base support for the flanges 4 and also permit a certain damping of the vibrations.

FIGS. 4 and 5 show a variant of the hinged joint according to the invention. This variant has a metal clip 12 in hairpinlike form, i.e. the metal clip 12 has a central part 12a, which is bent into a U-shape and whose free leg ends 12b are bent back outwards, so that clips are formed. Each clip laterally engages on one of the two corresponding radial attachments 13 and on each attachment 13 is provided a centering receptacle 14 for receiving each clip. The other features of this variant are identical to those shown in FIGS. 1 to 3 and are given the same references in FIGS. 4 and 5. Reference numeral 31 designates reinforcing ribs, which are formed on the half-shell-shaped flanges and which have a stiffening function, as well as contributing to moving the resonant frequency of the joint away from the engine frequency. Such ribs 31 can also be provided in the other embodiments.

As a result of its flexibility clip 12 permits a hinged joint of pipes 1 and 2, while at the same time the metal cushions 8 are rendered superfluous.

FIGS. 6 and 7 show another embodiment of the invention, in which axes corresponding to diameters of pipes 15, 16, in whose direction extend the radial attachments of each flange 18, are arranged orthogonally to one another. Each attachment 17 is connected to a central ring 19, which is located between the flanges 18 and serves as a gimbal. The joint is obtained in a similar manner to that shown in FIGS. 1 to 3, i.e. by an open metal clamp 20, whose opening engages on the gimbal 19 and on the outer wall of the considered attachment 17 having centering receptacles 21 of the free ends of ring 20. A metal cushion 22 is inserted between the ring 19 and each claw 17. Each flange 18 has lateral edges 23 bent over rearwards by 180°, which have a stiffening function and also displace the resonant frequency away from the engine frequencies. The edges 10 of the preceding embodiment could also be bent over in this way for stiffening purposes. In this embodiment, the pipes 15 and 16 can rotate about two different rotation axes.

Figure 8:
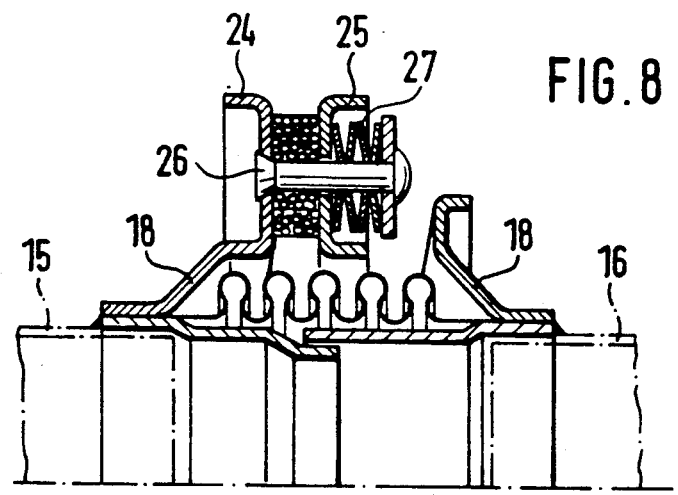
FIG. 8 is a longitudinal cross-sectional view of a further embodiment constructed in accordance with the present invention.

FIG. 8 shows an embodiment in which the connection of the radial attachments 24 to the gimbal 25 is formed by rivets 26, which are kept elastic due to the cup springs 27.

It is obvious that the invention is not restricted to the exemplified embodiments described hereinbefore. In fact, it covers all variants based on the same principle. Thus, it would not pass outside the scope of the invention to replace the bellows 8 by one or more laminas, an O-ring or by any device ensuring the necessary sealing and permitting a certain angular movement. The metal cushions can be replaced by another material, which has a similar flexibility, or by a relatively stiff material. Optionally, they can be completely omitted, if the freedom of movement is then made possible by the specific shape of the attachments at the contact points. The U-shaped part of the aforementioned metal clip could also be radially oriented. The open clamps can be elastic or plasto-elastic, i.e. permanently deformed on assembly. Moreover, these rings and the aforementioned metal clips can be constructed in the form of several parts, which are connected on assembly. There is also no need to telescope the internal pipes and this merely has the function of protecting the sealing element against contact with hot exhaust gases, so that it can be completely omitted or replaced by some other protective system. The metal cushions, metal clips and flanges can have widely differing shapes without casting doubts on the principle of the invention.

I claim:

1. A hinged joint for pipes having a sealing element, the hinged joint comprising a connecting flange provided on each pipe at a predetermined distance from an end thereof, each of said connecting flanges including two diametrically positioned radially outwardly directed fastening attachments adapted to be connected to a corresponding attachment of the other connecting flange so as to permit a rotary movement about an axis orthogonal to a longitudinal center axis of the pipes, elastic clamps, and metal wire cushions positioned between the corresponding radially outwardly directed fastening attachments, and wherein the elastic clamps include engagement end portions for engaging the respective fastening attachments in such a way that the fastening attachments are pressed against one another resulting in partial deformation of the metal wire cushions.

2. Hinged joint according to claim 1, wherein each of the fastening attachments includes an outer wall, and wherein receptacles are provided in the outer wall of each of the fastening attachments for engagement with the engagement end portion of the respective clamps.

3. Hinged joint according to claim 2, wherein each of said fastening attachments includes an interior surface, the receptacles are formed by one of drawing and stamping so as to form positioning elements for the metal wire cushions on the respective interior surface of the fastening attachments, and wherein each metal wire cushion is shaped so as to be engageable and positionable between the positioning elements of the fastening attachments.

4. Hinged joint for pipes having a sealing element, the hinged joint comprising a connecting flange provided on each pipe at a predetermined distance from an end thereof, each of said connecting flanges including two diametrically positioned radially outwardly directed fastening attachments adapted to be connected to a corresponding attachment of the other connecting flange so as to permit a rotary movement about an axis orthogonal to a longitudinal center axis of the pipes, a metal U-shaped clamp having free leg ends bent back so as to form clips laterally engageable on the fastening attachments.

5. Hinged joint according to one of claims 1 to 4, wherein outer diameters of each of the flanges, at least in an area of the fastening attachments, are orthogonal to one another, and wherein each fastening attachment is connected to a central ring located between the flanges and serving as a gimbal.

6. Hinged joint according to one of claims 1 to 4, wherein each flange includes at least one of a bent over lateral edge and reinforcing ribs for stiffening the respective flanges.

7. Hinged joint according to one of claims 1 to 3, wherein each of the clamps are multipartite and assembled at a time of installation.

8. Hinged joint according to claim 4, wherein each of the clips are multipartite and assembled at a time of installation.

9. Hinged joint according to one of claims 1 to 4 wherein outer diameters of each of the flanges, at least in an area of the fastening attachments, are disposed at an angle with respect to one another, and wherein each fastening attachment is connected to a central ring located between the flanges and serving as a gimbal.

* * * * *